(12) United States Patent
Wang

(10) Patent No.: US 8,982,543 B2
(45) Date of Patent: Mar. 17, 2015

(54) SLIDER FOR KEYBOARD

(71) Applicant: Dexin Corporation, New Taipei (TW)

(72) Inventor: Ting-Sheng Wang, New Taipei (TW)

(73) Assignee: Dexin Corporation, New Taipei (TW)

( * ) Notice: Subject to any disclaimer, the term of this patent is extended or adjusted under 35 U.S.C. 154(b) by 285 days.

(21) Appl. No.: 13/714,386

(22) Filed: Dec. 13, 2012

(65) Prior Publication Data

US 2014/0055937 A1    Feb. 27, 2014

(30) Foreign Application Priority Data

Aug. 23, 2012    (TW) .............. 101216280 U

(51) Int. Cl.
G06F 1/16    (2006.01)
G06F 3/02    (2006.01)

(52) U.S. Cl.
CPC ............ *G06F 1/1669* (2013.01); *G06F 3/0202* (2013.01); *G06F 3/0221* (2013.01); *G06F 3/0227* (2013.01)
USPC .................................................. 361/679.11

(58) Field of Classification Search
USPC ............. 361/679.08–679.2; 455/575.1–575.4
See application file for complete search history.

(56) References Cited

U.S. PATENT DOCUMENTS

| | | | | |
|---|---|---|---|---|
| 5,712,760 A * | 1/1998 | Coulon et al. | ........... | 361/679.15 |
| 6,205,021 B1 * | 3/2001 | Klein et al. | ............... | 361/679.17 |
| 6,457,996 B1 * | 10/2002 | Shih | .............. | 439/638 |
| 6,547,463 B1 * | 4/2003 | Loo | ................................ | 400/472 |
| 6,590,547 B2 * | 7/2003 | Moriconi et al. | ................ | 345/30 |
| 6,594,142 B2 * | 7/2003 | Katz | ........................ | 361/679.16 |
| 6,614,649 B1 * | 9/2003 | Wang | ........................ | 361/679.11 |
| 6,632,037 B2 * | 10/2003 | Lin et al. | ........................ | 400/472 |
| 6,655,863 B2 * | 12/2003 | Lin | .............. | 400/491 |
| 7,327,560 B1 * | 2/2008 | Tabasso et al. | .......... | 361/679.09 |
| 7,446,757 B2 * | 11/2008 | Mochizuki et al. | ........... | 345/168 |
| 7,633,745 B2 * | 12/2009 | Sakakibara et al. | ..... | 361/679.11 |
| 7,764,489 B2 * | 7/2010 | Kim et al. | ................ | 361/679.16 |
| 8,159,414 B2 * | 4/2012 | Pate et al. | ....................... | 345/1.1 |
| 2001/0001083 A1 * | 5/2001 | Helot | ........................... | 439/131 |
| 2002/0020789 A1 * | 2/2002 | Li | ................................ | 248/175 |
| 2003/0095380 A1 * | 5/2003 | Chen et al. | ..................... | 361/686 |
| 2003/0137803 A1 * | 7/2003 | Loo | ................................ | 361/680 |
| 2004/0066611 A1 * | 4/2004 | Wu | ................................ | 361/680 |
| 2005/0002158 A1 * | 1/2005 | Olodort et al. | ................ | 361/683 |
| 2005/0078443 A1 * | 4/2005 | Lee et al. | ....................... | 361/683 |
| 2005/0258021 A1 * | 11/2005 | Liu et al. | ....................... | 200/5 A |
| 2006/0077622 A1 * | 4/2006 | Keely et al. | .................... | 361/681 |
| 2008/0285213 A1 * | 11/2008 | Tan et al. | ....................... | 361/680 |
| 2012/0162889 A1 * | 6/2012 | Han | ........................ | 361/679.09 |
| 2013/0215565 A1 * | 8/2013 | Nakada et al. | ........... | 361/679.09 |
| 2014/0055936 A1 * | 2/2014 | Wang | ........................ | 361/679.15 |

* cited by examiner

*Primary Examiner* — Adrian S Wilson
(74) *Attorney, Agent, or Firm* — Li & Cai Intellectual Property (USA) Office

(57) ABSTRACT

A slider for keyboard is disclosed, which comprises a keyboard, a slider, and a supporting frame. The slider is slidably disposed on the lateral side of the keyboard. The supporting frame is pivotally connected to the slider. The keyboard includes a top shell and a bottom shell, the top shell formed with a first sliding rail and the bottom shell formed with a second sliding rail. The slider is slightly bent defining a first block and a second block, a first track is formed on the first block, and a second track is formed on the second block. The first sliding rail is slidably received by the first track, and the second sliding rail is slidably received by the second track.

9 Claims, 11 Drawing Sheets

SLIDER FOR KEYBOARD

BACKGROUND OF THE INVENTION

1. Field of the Invention

The instant disclosure relates to a slider for keyboard and more particularly to a slider for wireless keyboard with a supporting frame.

2. Description of Related Art

Most of portable electronic devices, such as smart phones, tablets, are equipped with touch screens yet without actual keyboards for typing. When users need larger keyboard display, the size of the virtual keypad on the touch screen may not meet the requirement. Therefore, plenty of external keyboards appear on the market in cooperation with portable electronic devices to provide normal sized input keyboards. However, the conventional external keyboards have supporting frames for placing electronic devices fixed on a side thereof. Thus, the supporting frames cannot slide, and the assembly of the external keyboards is relatively complicated. Another drawback of the conventional external keyboards is that the keyboard is prone to break when dropped off.

Based on research, the inventor proposes the instant disclosure to address the above issues.

SUMMARY OF THE INVENTION

The instant disclosure is to provide a slider for keyboard with a supporting frame sliding along the lateral edge of the keyboard. Tracks are integrally formed within a slider and slidably engaged with the keyboard, thus allowing a supporting frame to slide along the lateral edge of the keyboard. An electronic device can be placed on the supporting frame and wirelessly connected to the keyboard. The keyboard is used as an input method without turning line of sight.

To achieve the aforementioned objectives, the slider for keyboard includes a keyboard, a slider and a supporting frame. The slider is movably disposed on the lateral edge of the keyboard and the supporting frame pivotally connects the slider. The keyboard has a top shell formed with a first sliding rail and a bottom shell formed with a second sliding rail. The slider is slightly bent defining a first block and a second block. A first track is formed on the first block and similarly a second track is formed on the second block. The first sliding rail is received by the first track and allowed for linear movement thereon. Likewise the second sliding rail is received by the second sliding track and allowed for linear movement as well.

The tracks can be integrally formed with the slider from an extruded aluminum. The first and second sliding rails are received by the first and second tracks respectively so to allow the first and second blocks of the slider to clamp on the top and bottom shells of the keyboard separately. The first and second blocks prevent the keyboard from cracking when dropped off. The supporting frame can tilt and slide along the keyboard through the slider, thus providing the freedom of the supporting frame position. An electronic device can be placed on the supporting frame and wirelessly connected to the keyboard. The keyboard is used for typing without turning the line of sight.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF PREFERRED EMBODIMENTS

Figure 1:
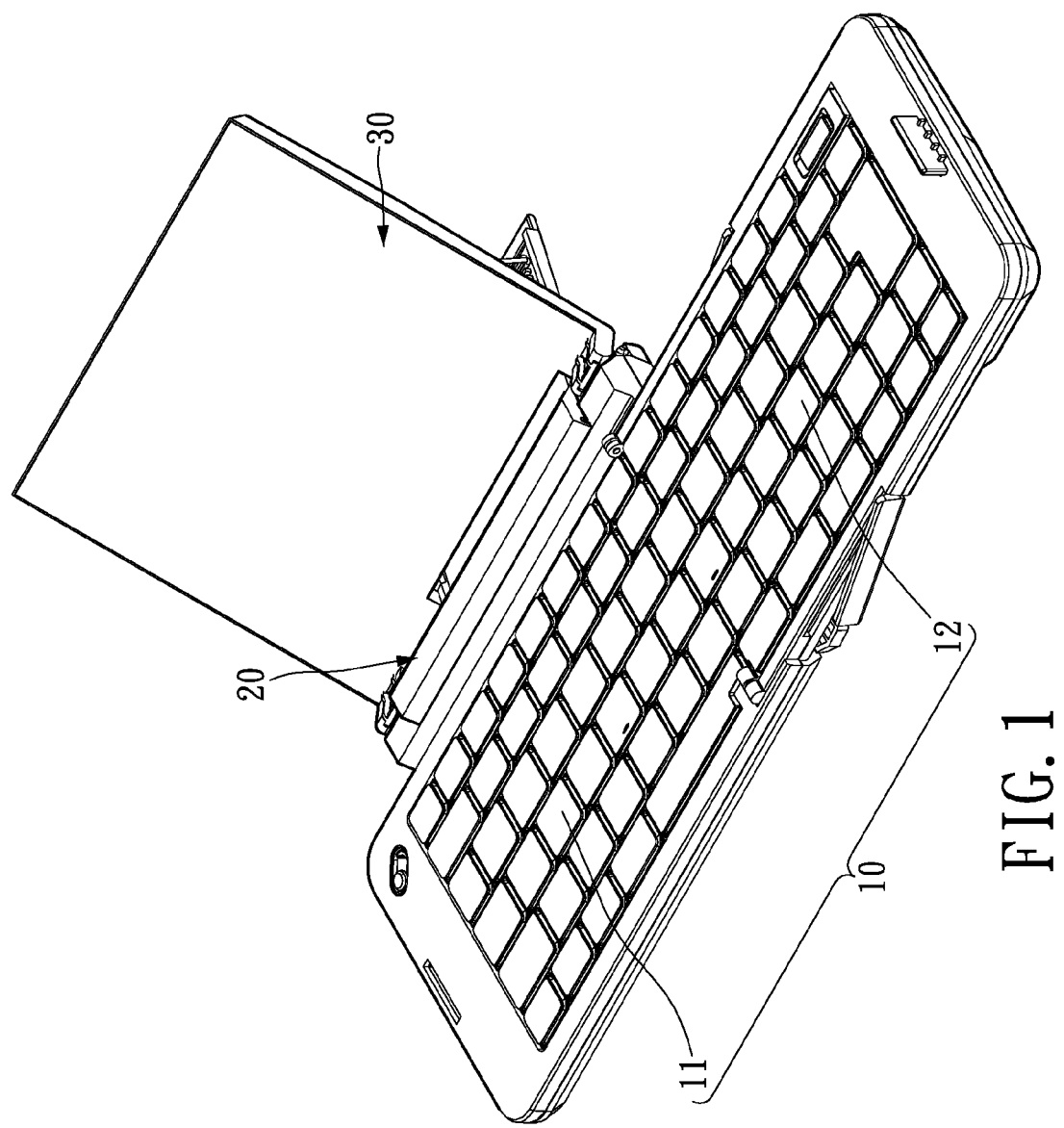
FIG. 1 is a perspective view of a slider for keyboard in accordance with the instant disclosure.

Please refer to FIGS. 1 to 4, which show a slider for keyboard in accordance with an embodiment of the instant disclosure. In the embodiment the keyboard 10 is, but not limited to, a foldable wireless keyboard, and the keyboard 10 can be a standard wireless keyboard, or a compact size wireless keyboard. Referring to FIG. 1, the slider for keyboard includes a keyboard 10, a slider 20, and a supporting frame 30.

The slider 20 is slidably disposed on the keyboard 10. The supporting frame 30 is pivotally connected to the slider 20. The keyboard 10 is a foldable wireless keyboard which can be divided into a first keyboard portion 11 and a second keyboard portion 12. The first and second keyboard portions 11, 12 are pivotally connected to each other. When folded (i.e. the keyboard in a folded state), the first and second keyboard portions 11, 12 stack on each other.

Figure 2:
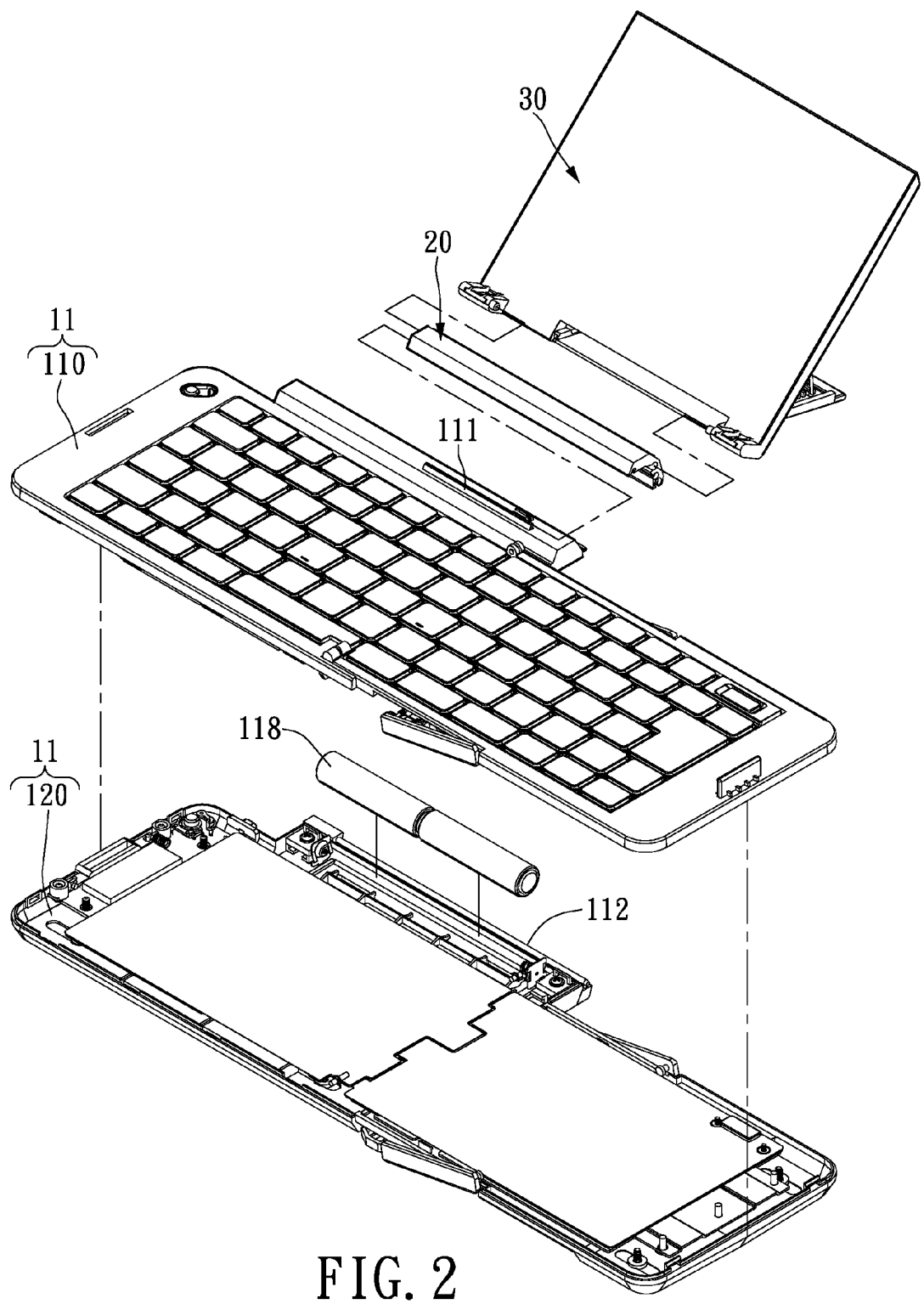
FIG. 2 is an exploded view of a slider for keyboard in accordance with the instant disclosure.

Referring to FIG. 2, the first keyboard portion 11 of the keyboard 10 has a top shell 110 and a bottom shell 120. A first sliding rail 111 protrudes from the top shell 110, and a second sliding rail 112 is formed conformingly to the first sliding rail 111 on the bottom shell 120.

Figure 3:
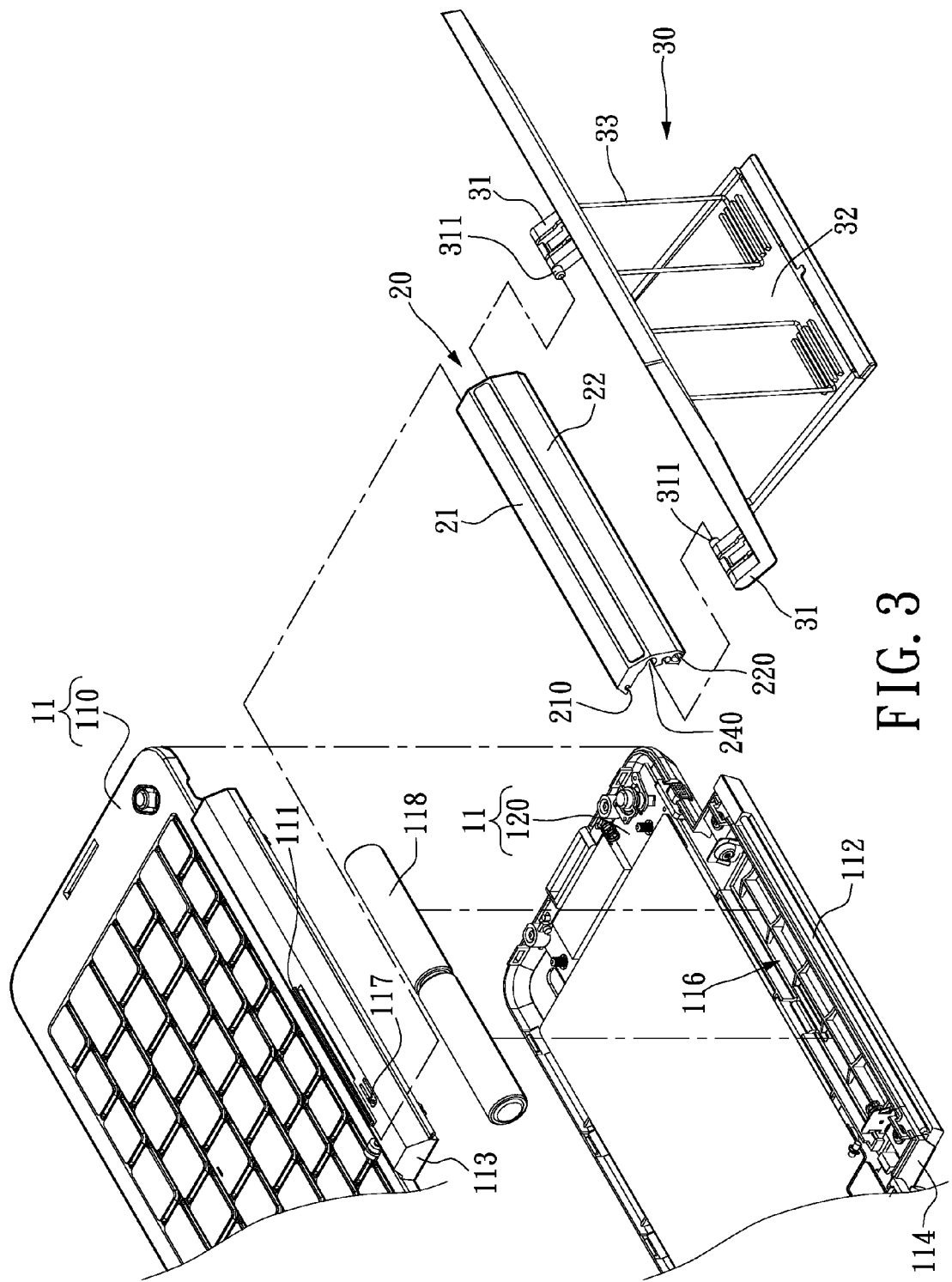
FIG. 3 is a partially exploded view of a slider for keyboard in accordance with the instant disclosure.
Figure 4:
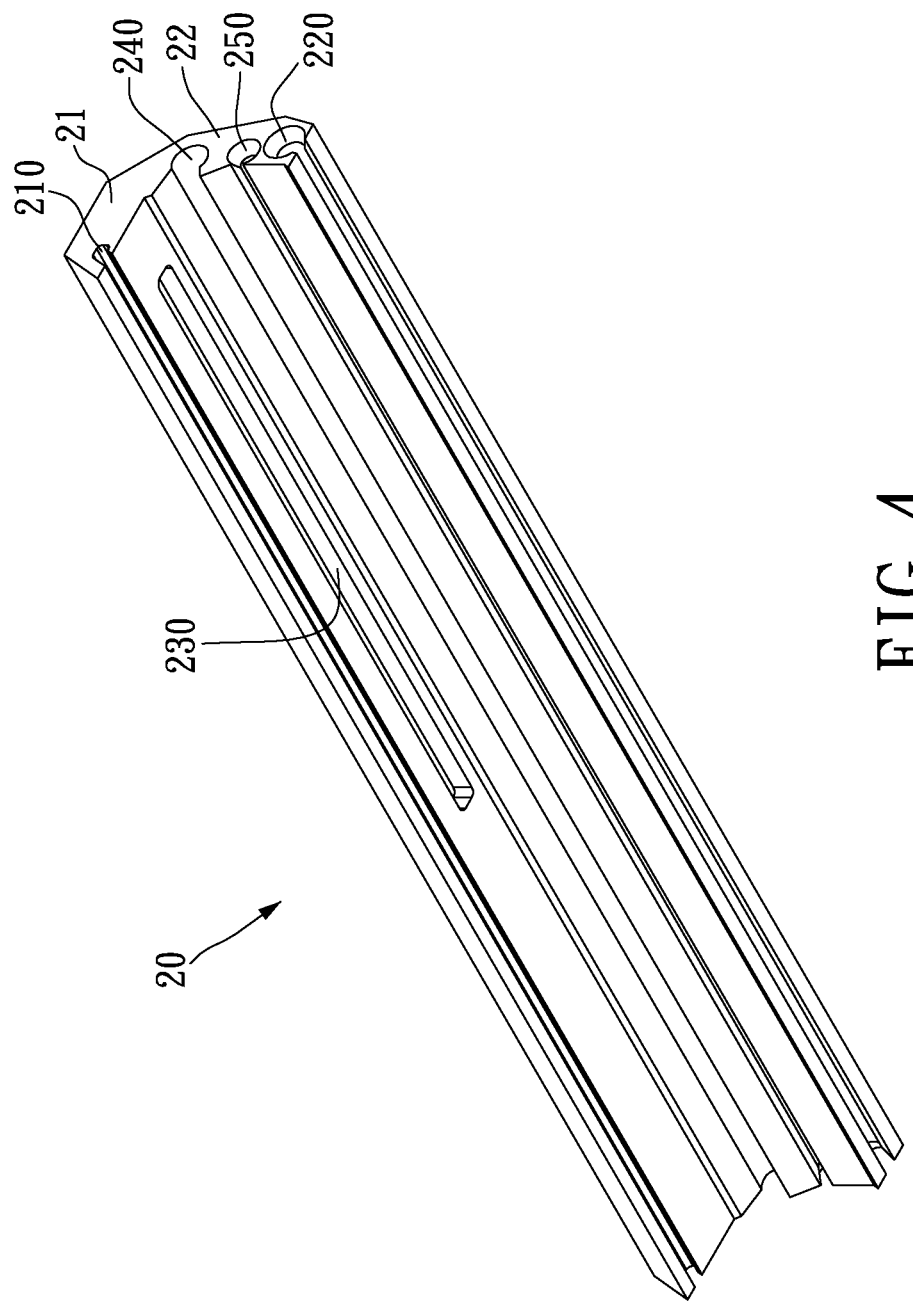
FIG. 4 is an enlarged view of a slider in accordance with the instant disclosure.
Figure 5:
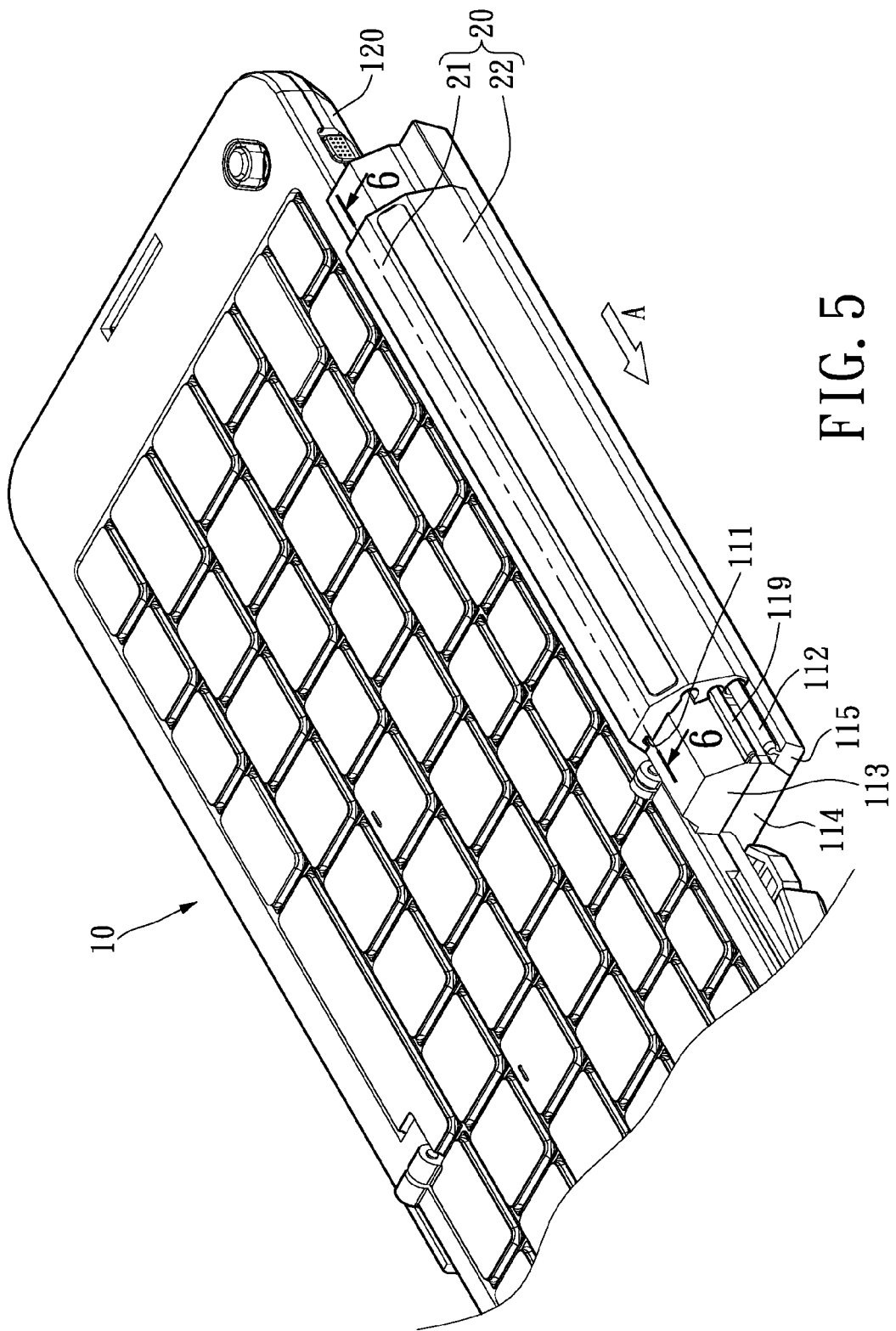
FIG. 5 is a fragmented perspective view of a slider for keyboard in accordance with the instant disclosure.

Referring to FIGS. 3 to 5, the slider 20 is substantially L-shaped. The slider 20 is slightly bent defining a first block 21 and a second block 22. A first track 210 is laterally formed on the first block 21, and a second track 220 is also laterally formed on the second block 22. The first sliding rail 111 is received by the first track 210, while the second sliding rail 112 is received by the second track 220. The slider 20 is formed by metal materials, for example, an extruded aluminum block, thus having the cross-section of slider 20 substantially equal.

Furthermore, the top shell 110 has a top shell extension 113 which extends conplanarly from the top shell 110, and the bottom shell 120 has a bottom shell extension 114 which extends coplanarly from the bottom shell 120. The top and bottom shell extensions 113, 114 are positioned on the lateral side of the first keyboard portion 11. More specifically, the first sliding rail 111 is formed on the top shell extension 113 of the top shell 110 and extends toward the bottom of the first block 21; the second sliding rail 112 is formed on the bottom shell extension 114 of the bottom shell 120 and extends toward the second block 22. In the embodiment, the bottom shell extension 114 further has a block 115 which extends from a lateral side of the bottom shell extension 114, and the second sliding rail 112 is formed on the block 115 (FIG. 5). The slider 20 can slide along an operating axis A relative to the keyboard 10.

Moreover, the top shell extension 113 and the bottom shell extension 114 jointly define a battery case 116. The first block 21 of the slider 20 is slidably connected to the top shell extension 113, and the second block 22 of the slider 20 is slidably connected to the bottom shell extension 114 so to allow the slider 20 to slidably clamp on the battery case 116.

Figure 6:
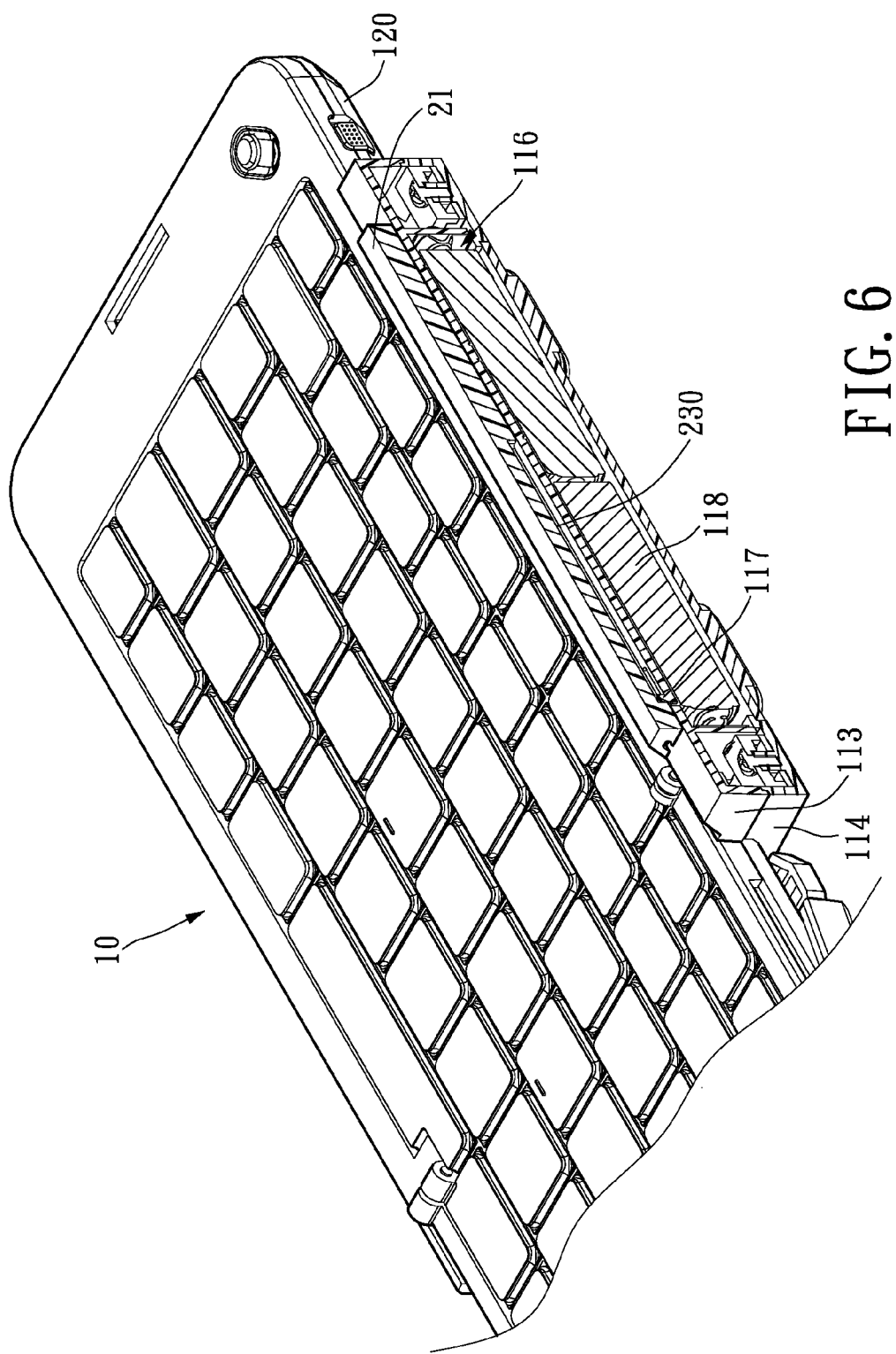
FIG. 6 is another fragmented perspective view of a slider for keyboard in accordance with the instant disclosure.
Figure 7:
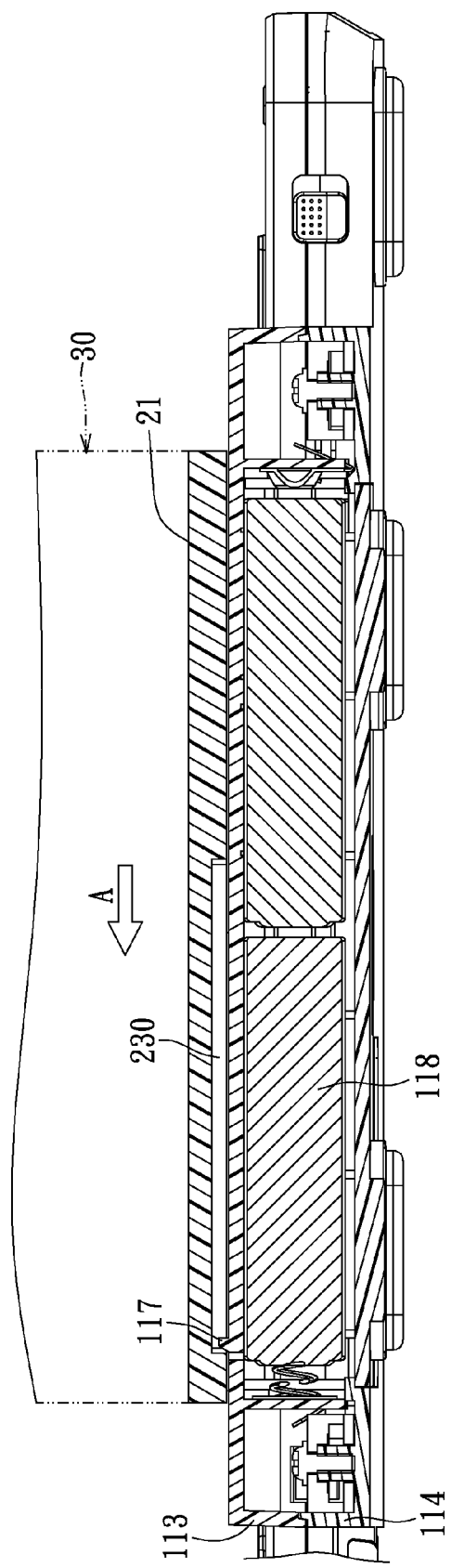
FIG. 7 is a partially sectional view of a slider for keyboard in accordance with the instant disclosure.

Referring to FIGS. 6, 7, and 3, a resilient stopper arm 117 is formed on the top surface of the top shell extension 113, and a positioning slot 230 is formed proximate to the first track 210 and aligned in parallel. The resilient stopper arm 117 stretches into the positioning slot 230 in order to define the sliding distance of the slider 20 along the operating axis A. In addition, the resilient stopper arm 117 prevents the slider 20 from sliding off the keyboard 10. Preferably, the length of the positioning slot 230 is approximately half the length of the first block 21. In other words, the length of the positioning slot 230 is approximately the sliding distance of the slider 20 along the operating axis A.

To assemble the slider and keyboard, the tracks mate with the rails and slide along the reverse of the operating axis A. Thus the first block 21 firstly compresses resilient stopper arm 117 and then the resilient stopper arm 117 is released when extending into the positioning slot 230. The slide-in assembly is easier because of the absence of other fastening tools like screw drivers. In addition, when a battery 118 is placed in the battery case 116, the battery 118 abuts against the resilient stopper arm 117 so that the battery 118 further supports the resilient stopper arm 117 to avoid breakage.

Referring again to FIGS. 3 to 5, a supporting slot 240 is formed at the seam between the first and second blocks 21, 22 of the slider 20. Each of two protruding portions 31, extending from either edge of the supporting frame 30 has a boss 311. The bosses 311 conform to the supporting lot 240 from either side and are pivotally connected thereto, so that the supporting frame 30 can be pivotally connected to the slider 20.

In addition, the supporting frame 30 further includes an auxiliary supporting frame 32 and a stand 33. The auxiliary supporting frame 32 and the stand 33 are pivotally connected to the rear of the supporting frame 30, and the stand 33 can be engaged with the auxiliary supporting frame 32 to support different angles of tilting.

Furthermore, a third track 250 is formed between the supporting slot 240 and the second track 220 on the second block 22 of the slider 20. The third track 250 receives a third sliding rail 119 formed on the top shell extension 113.

The first, second, and third sliding rails 111, 112 and 119 are slidably received by the first, second, and third tracks 210, 220, and 250 respectively. The arrangement allows the first block 21 and the second block 22 of the slider 20 slidably clamping on the top shell extension 113 and the bottom shell extension 114 of the keyboard 10 to avoid the battery case 116 defined by the top and bottom shell extensions 113, 114 cracking when dropped off.

The first, second, and third tracks 210, 220, and 250 and the supporting slots 240 are integrally formed on the slider 20 through an extruded aluminum. (The slider 20 along with the plurality of tracks (i.e. first, second, and third tracks 210, 220, and 250 and the supporting slot 240) are formed by extrusion on a piece of aluminum.) Thereby, the slider 20 and the tracks can be easily integrally formed without the need of draft angle.

In detail, the cross sectional view of the first track 210 is intrinsically bent, whereas the cross sectional view of the second and third tracks 220, 250 are arc shaped.

Figure 8:
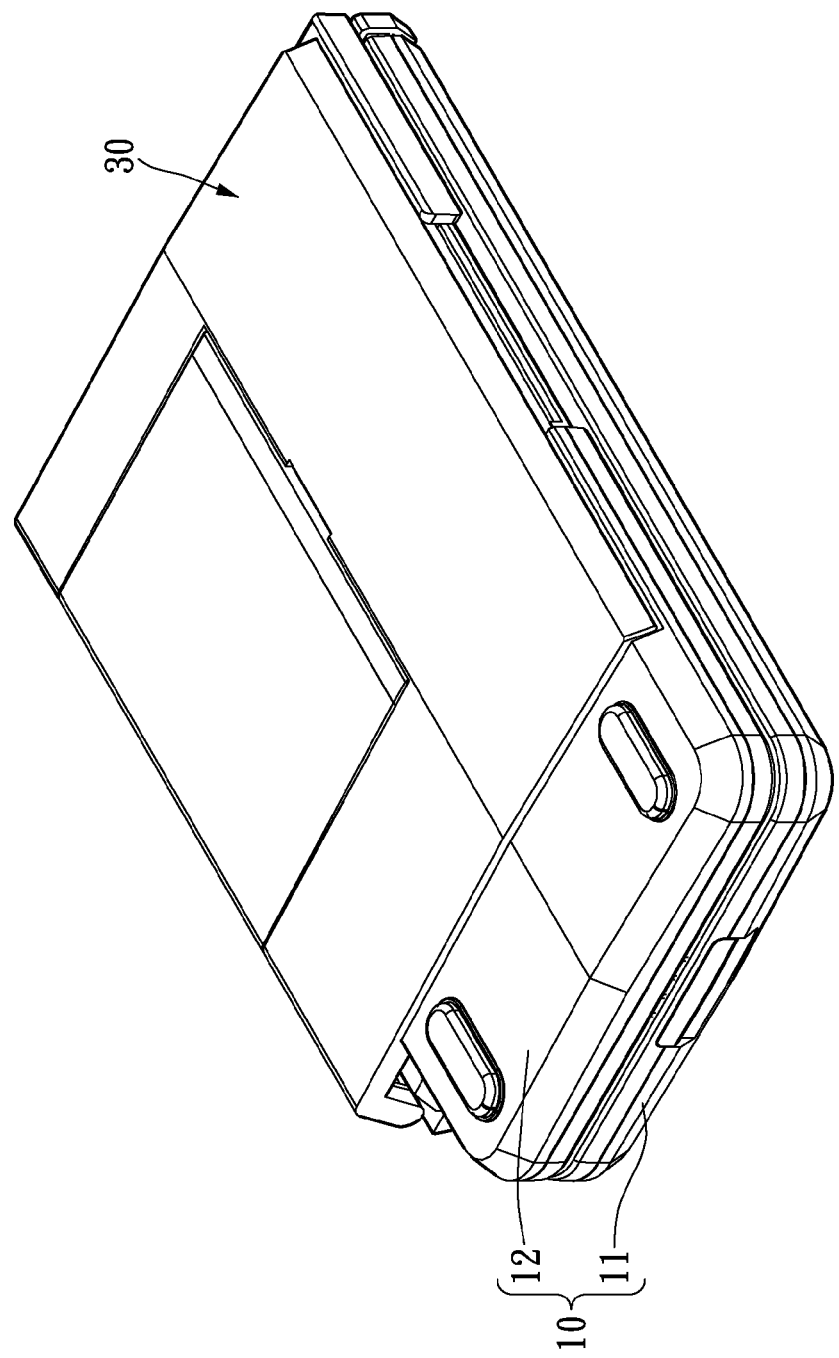
FIG. 8 is a perspective view of a slider for keyboard in a folded state in accordance with the instant disclosure.
Figure 9:
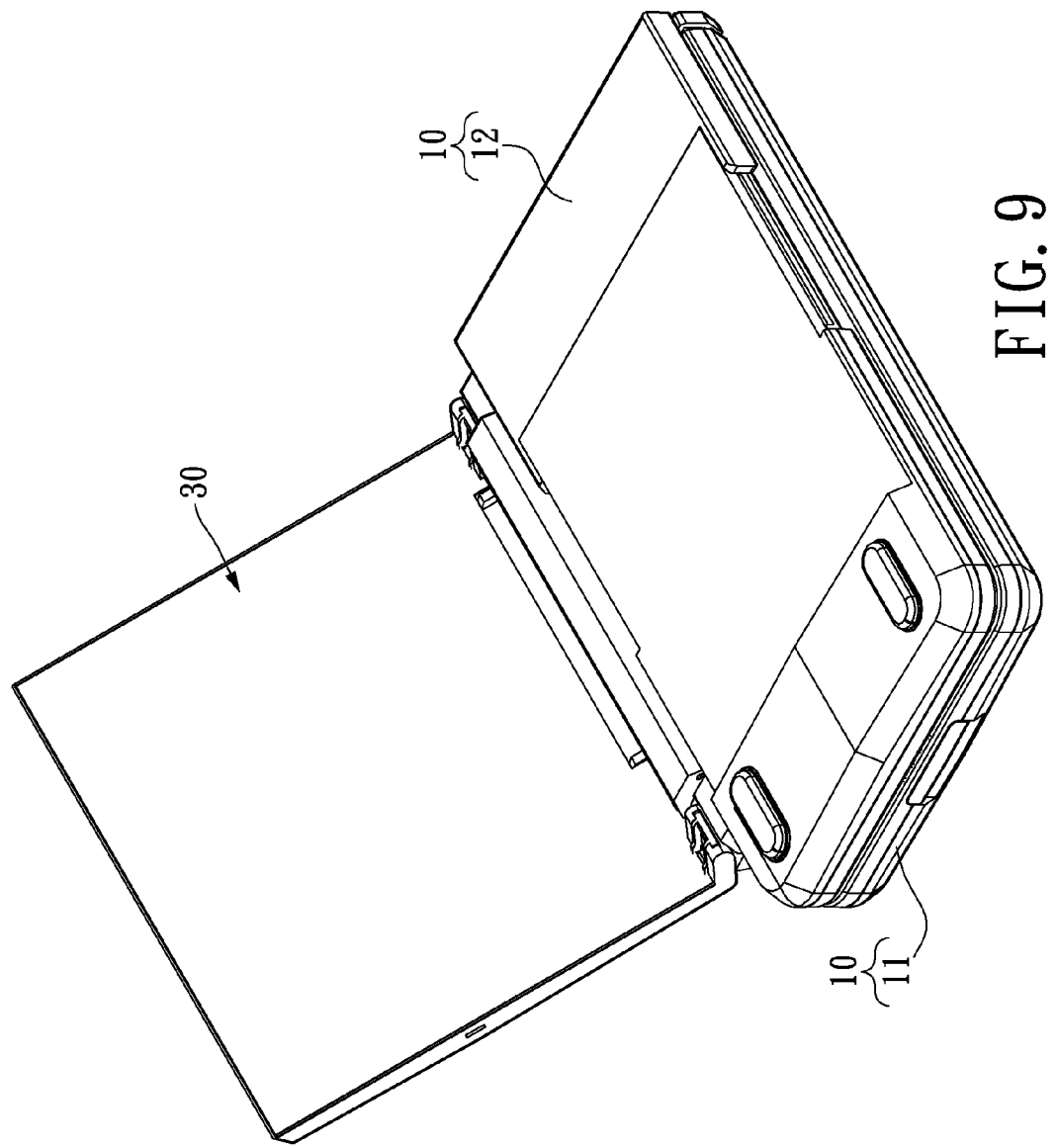
FIG. 9 is a perspective view of a slider for keyboard in a closed state in accordance with the instant disclosure.
Figure 10:
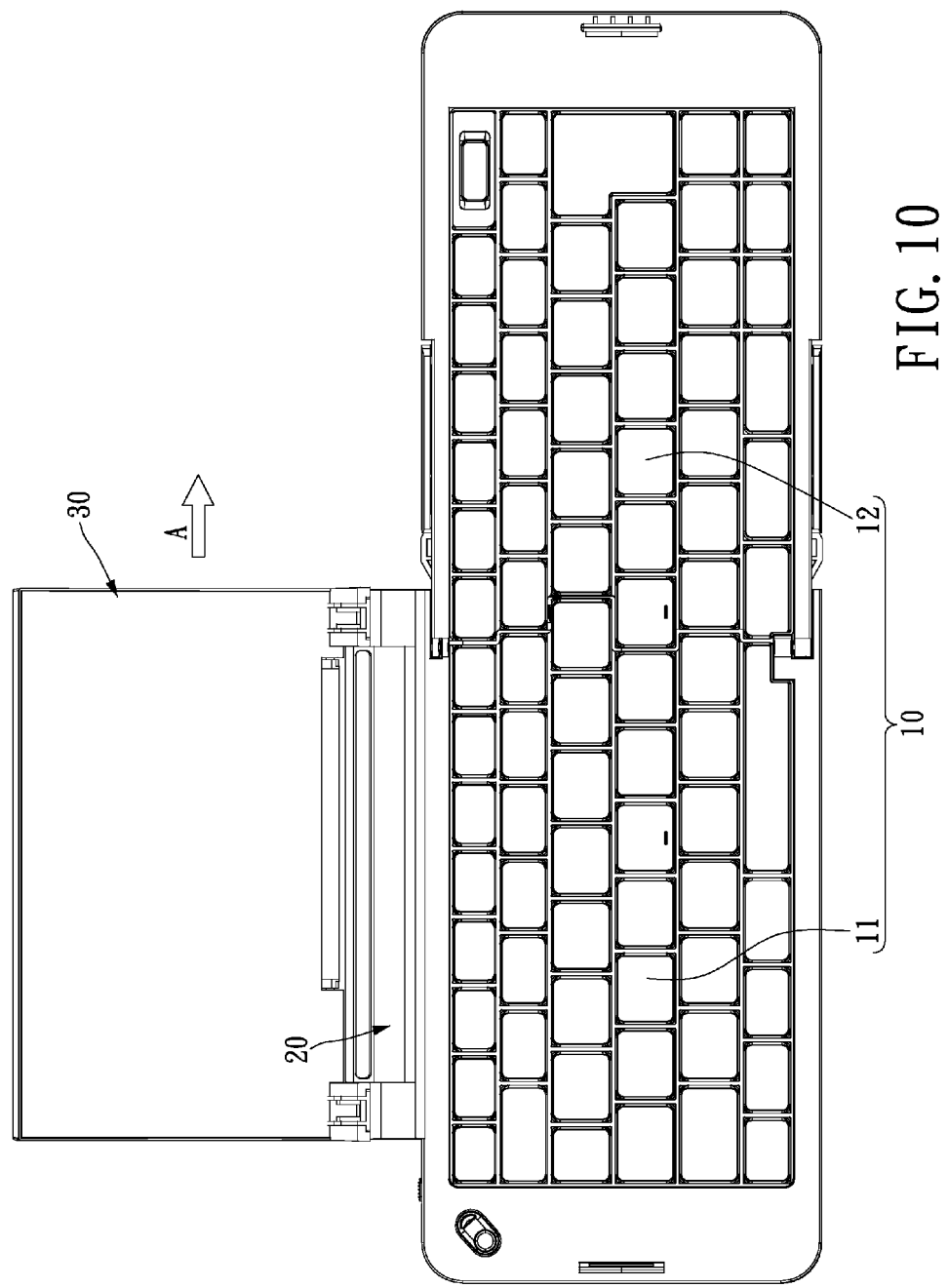
FIG. 10 is a perspective view of a slider for keyboard in a fully flattened state in accordance with the instant disclosure.
Figure 11:
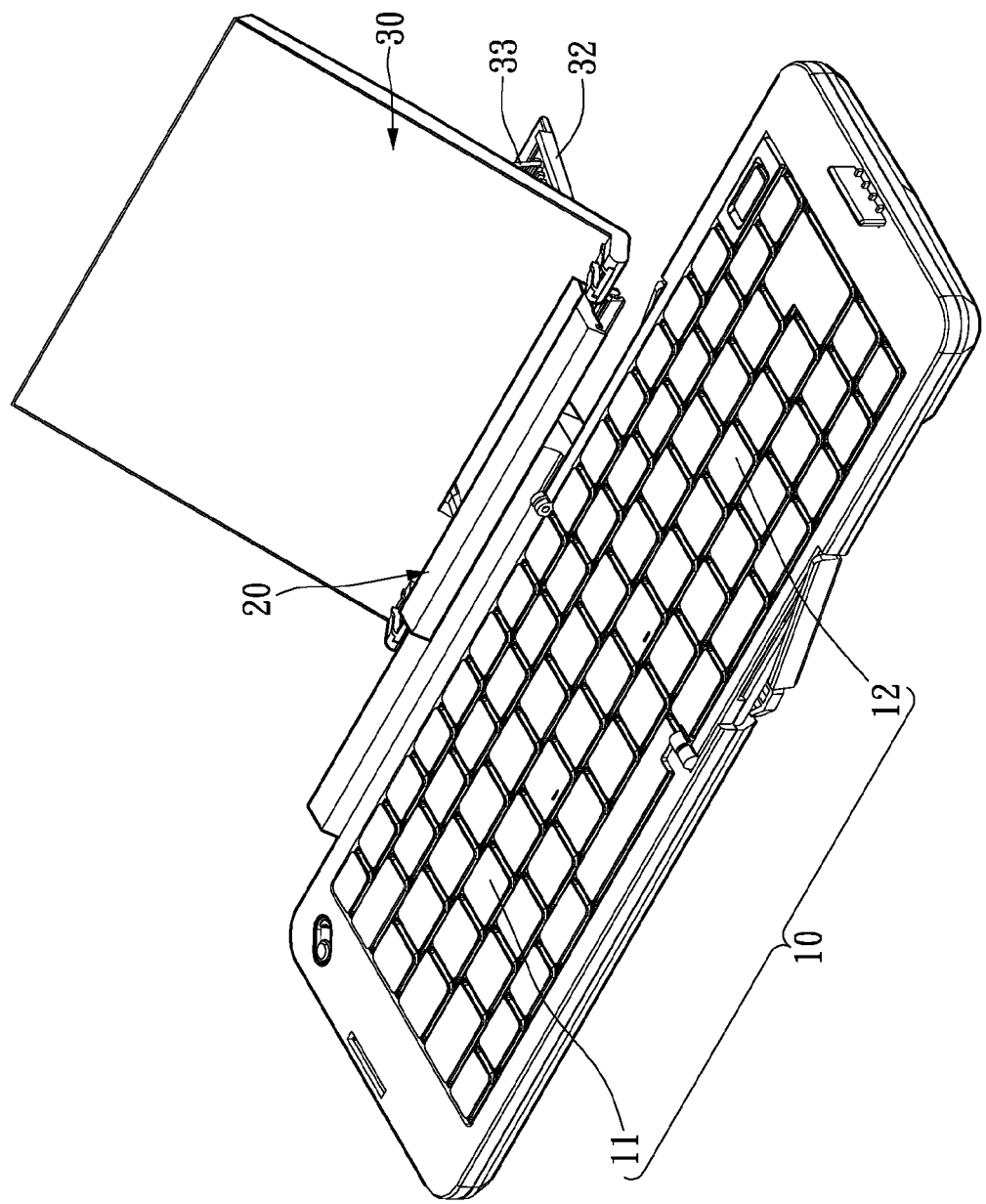
FIG. 11 is a perspective view of a supporting frame sliding to the middle of a keyboard in accordance with the instant disclosure.

Referring to FIGS. 8 to 11. With reference to FIG. 8 firstly shows the instant disclosure in a folded state. In use, a user flips the supporting frame 30 as shown in FIG. 9, i.e., unfolded state of the instant disclosure. The first and second keyboard portion 11, 12 are unfolded as well, therefore displaying the instant disclosure in a flattened state (as shown FIG. 10). The supporting frame 30 can slide along the operating axis A to the middle of the keyboard 10. Thereby, the user may place electronic device on the supporting frame 30 and use the keyboard 10 as an input device without turning line of sight. When a heavier electronic device, such as tablet, the auxiliary supporting frame 32 can be pulled out from the rear of the supporting frame 30. The stand 33 can be adjusted to fix the angle between the supporting frame 30 and the auxiliary supporting frame 32 thus providing a force to support the structure.

In summary, the slider and tracks can easily be integrally formed by an extruded aluminum without the need of draft angle. The first and second blocks of the slider slidably clamp on the battery case to avoid the keyboard cracking when dropped off. The slider can easily be assembled to the keyboard through the positioning slot and the resilient stopper arm, thus further preventing the slider from sliding off the keyboard.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. A slider for keyboard , comprising:
a keyboard including a top shell and a bottom shell, the top shell formed with a first sliding rail and the bottom shell formed with a second sliding rail;
a slider slidably disposed on the lateral side of the keyboard; and
a supporting frame pivotally connected to the slider;
wherein the slider is slightly bent defining a first block and a second block, a first track is formed on the first block, and a second track is formed on the second block;
wherein the first sliding rail is slidably received by the first track, and the second sliding rail is slidably received by the second track.

2. The slider for keyboard of claim 1, wherein the top shell has a top shell extension which extends from the top shell, the bottom shell has a bottom shell extension which extends from the bottom shell, the first sliding rail is formed on the top shell extension, and the second sliding rail is formed on the bottom shell extension.

3. The slider for keyboard of claim 2, wherein the top shell extension and the bottom shell extension jointly define a battery case, and the slider clamps on the battery case.

4. The slider for keyboard of claim 3, wherein a resilient stopper arm is formed on the top surface of the top shell extension, a positioning slot is formed on the first block proximate to the first track and aligned in parallel, and the resilient stopper arm stretches into the positioning slot.

5. The slider for keyboard of claim 4, wherein the slider further has a supporting slot which is formed on the seam between the first and second blocks of the slider, two protruding portions respectively extend from the edge of the supporting frame, and each of the two protruding portions has a boss conforming to the supporting slot.

6. The slider for keyboard of claim 5, wherein the slider further has a third track which is formed between the supporting slot and the second track of the slider, and a third sliding rail formed on the top shell extension is slidably received by the third track.

7. The slider for keyboard of claim 6, wherein the first, second, and third tracks and the supporting slot are integrally formed on the slider by extrusion of a piece of aluminum.

8. The slider for keyboard of claim 7, wherein the cross-section of the first track is intrinsically bent, and the cross-sections of the second and third tracks are arc shaped.

9. The slider for keyboard of claim 8, wherein the length of the positioning slot is substantially half the length of the slider.

\* \* \* \* \*